United States Patent [19]

Noda et al.

[11] Patent Number: 5,296,569
[45] Date of Patent: Mar. 22, 1994

[54] COMPLEX MICROSPHERES, METHOD OF MAKING SAME, AND THERMOPLASTIC FILMS CONTAINING SAME

[75] Inventors: Ippei Noda; Masanobu Abe; Fumitoshi Sugiura, all of Aichi, Japan

[73] Assignee: Takemoto Yushi Kabushiki Kaisha, Aichi, Japan

[21] Appl. No.: 46,393

[22] Filed: Apr. 12, 1993

Related U.S. Application Data

[63] Continuation-in-part of Ser. No. 655,109, Feb. 14, 1991, abandoned.

[30] Foreign Application Priority Data

Feb. 22, 1990 [JP] Japan .................................. 2-42130
Mar. 29, 1990 [JP] Japan .................................. 2-81986

[51] Int. Cl.$^5$ .......................................... C08F 283/12
[52] U.S. Cl. .................................... 525/445; 525/100; 525/104; 525/106; 525/446; 525/431; 525/479; 525/63; 428/402
[58] Field of Search ............... 525/479, 903, 100, 445, 525/446, 431; 428/402

[56] References Cited

U.S. PATENT DOCUMENTS 4,918,132  4/1990  Hongo et al. ...................... 524/504

FOREIGN PATENT DOCUMENTS 315836  5/1989  European Pat. Off. .

*Primary Examiner*—Ralph H. Dean
*Attorney, Agent, or Firm*—Heller, Ehrman, White & McAuliffe

[57] ABSTRACT

Complex microspheres consist of polysiloxane and vinyl polymers which are unistructurally mixed together and substantially free of covalent bonds therebetween. Polysiloxane and vinyl polymer are contained at ratio of 97/3~30/70 by weight, the average diameter of the complex microspheres is 0.05~30 μm, the standard deviation of their particle size is 1.0~2.5, and the ratio between their major and minor axes is 1.0~1.2. Thermoplastic films containing such complex microspheres at a specified rate have improved lubricity and antiblocking properties.

18 Claims, No Drawings

COMPLEX MICROSPHERES, METHOD OF MAKING SAME, AND THERMOPLASTIC FILMS CONTAINING SAME

This application is a continuation-in-art of Ser. No. 655,109, filed Feb. 14, 1991 which is now abandoned.

BACKGROUND OF THE INVENTION

This invention relates to a method of making complex microspheres, complex microspheres made by such a method and thermoplastic films containing such complex microspheres.

It has been known to add complex microspheres to paints, cosmetic products, rubbers, plastics, paper and the like during their production or fabrication processes in order to improve their properties or, more specifically, to thermoplastic films during their production or fabrication process in order to modify their properties. Nowadays, polyolefin, polyester, polyvinyl chloride, polyamide, polystyrene and many other kinds of thermoplastic films are widely being used as industrial base films, for example, as lapping material, for photography, as magnetic memory media and as capacitors. With the recent demands for higher performance and greater variety of these base films, however, it is becoming of vital importance to further improve the surface characteristics of these films. In the field of magnetic memory media using a base film produced from a resin composition having linear aromatic polyester as its principal element, for example, there is a strong demand not only regarding its thickness but also for improved lubricity because of the requirement of high memory density, high capacity and high reliability. In the field of lapping materials using base films of a resin composition having polyolefin as its principal element, as another example, there is a strong requirement for anti-blocking characteristics because the surfactants and water-soluble macromolecules which are applied to the film for providing improved antistatic, printable and anticloud properties tend to enhance the blocking between the film surfaces.

In the past, use of particles of different kinds such as polystyrene, polyvinyl acetate, polyethylene, nylon, epoxy resins, phenol resins and polysiloxane has been proposed. As examples of polysiloxane particles, use of silica particles (i. Colloid and Interface Sci., Vol. 26, 62–69, 1968), polymethylsilsesquioxane particles (Japanese Patent Publication Tokkai 63-77940), and polyorganosiloxane particles (Japanese Patent Publication Tokkai 63-312324) has been proposed. Regarding the modification of thermoplastic films by the application of such polysiloxane particles, Japanese Patent Publication Tokkai 59-171623 reported improved lubricity by their application onto a polyester film.

There are problems with these prior art particles. Firstly, they are easily breakable by a mechanical impact. Secondly, they do not disperse easily inside a medium or a polymer material. Thirdly, their dispersion stability is poor. Fourthly, their shapes and size distribution are not uniform. These problems make it difficult as a matter of fact to accomplish the desired modification of a film. In other words, even if polysiloxane particles of the kinds which have been suggested are applied to a thermoplastic film, the kind of improved lubricity and anti-blocking properties which is recently being required of thermoplastic films cannot be realized without adversely affecting their basic original characteristics.

SUMMARY OF THE INVENTION

It is therefore an object of the present invention to provide a method of making improved complex microspheres with which the problems associated with conventional particles described above can be eliminated.

It is another object of the invention to provide improved complex microspheres which can be obtained by such a method.

It is still another object of the invention to provide thermoplastic films containing such complex microparticles and having improved lubricity and anti-blocking properties.

This invention has been accomplished by the present inventors as a result of their studies in view of the above and other objects and is based on their discovery that these objects can be achieved by providing complex microspheres of a particular kind, consisting of polysiloxane and vinyl polymer. In complex microspheres of the present invention, polysiloxane and vinyl polymer are unistructurally mixed together while being substantially free of covalent bonds therebetween. Polysiloxane and vinyl polymer should be contained at ratio of 97/3~30/70 by weight, the average diameter of the complex microspheres should be 0.05~30 $\mu$m, the standard deviation of their particle size should be 1.0~2.5, and the ratio between their major and minor axes should be 1.0~1.2.

The invention further relates to a method of producing such complex microspheres and thermoplastic films with improved lubricity and anti-blocking properties containing such complex microspheres.

DETAILED DESCRIPTION OF THE INVENTION

In one aspect, the present invention relates to complex microspheres composed principally of polysiloxane and vinyl polymer which are integrally (unistructurally) mixed together and substantially free of covalent bonds therebetween, the weight ratio (polysiloxane/vinyl polymer) being 97/3~30/70 therein, their average diameter being 0.05~30 $\mu$m, the standard deviation of the particle size being 1.0~2.5 and the ratio of their major to minor axes being 1.0~1.2. In another aspect, the present invention relates to a method of making such complex microspheres. The method according to the present invention is characterized by the step of polycondensation of silanol group-forming compound of Type (I) described below while it is being caused to undergo hydrolysis in the absence of emulsifier in an aqueous medium containing this silanol group compound and water insoluble vinyl monomer of Type (II) described below such that the weight ratio (I)/(II) is 99/1~33/67 under a two-layer condition so as to produce complex microspheres of polysiloxane mixed with the water-insoluble vinyl monomer, followed by the step of polymerizing the water-insoluble vinyl monomer in the presence of a radical initiator.

The aforementioned complex microspheres according to the present invention are characterized as having been produced by such a method. In still another aspect, the present invention relates to thermoplastic films with improved lubricity and anti-blocking properties characterized as containing such complex microspheres of the present invention.

The particular type of silanol group-forming compound referenced above by (I) is a compound shown either by $$R^1_p\text{-}SiX_{4-p} \qquad \text{Formula (1)}$$

or by

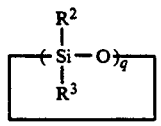

$$\text{Formula (2)}$$

and containing at least 15 mole % (hereinafter expressed in terms of the quantity of silicon with respect to the entire compound) of silanol group-forming compound of the form $R^1\text{-}SiX_3$ and/or silanol group-forming compound of the form $SiX_4$, where p is an integer $0\sim3$; q is an integer $3\sim20$; $R^1$, $R^2$ and $R^3$ are non-substituted or substituted hydrocarbon groups having a carbon atom directly connected to a silicon atom and no tendency to undergo radical polymerization; and X is alkoxy group with $1\sim4$ carbon atoms, alkoxyethoxy group having alkoxy group with $1\sim4$ carbon atoms, acyloxy group with $2\sim4$ carbon atoms, N,N-dialkylamino group having alkyl group with $1\sim4$ carbon atoms, hydroxyl group, halogen atom, or hydrogen atom. The water-insoluble vinyl monomer of the particular kind referenced above by (II) is one kind or more which are not reactive with silanol group or silanol group-forming atoms.

The average diameter according to the present invention is the value obtained by arbitrarily selecting 50 particles from a photograph by an electron microscope, measuring for each the major axis $D_1$ (the longest diameter passing through the center of the particle) and the minor axis $D_2$ (the shortest diameter passing through the center of the particle) and taking the average of calculated values $(D_1+D_2)/2$. The ratio of the major and minor axes defining the present invention is the average value of $D_1/D_2$ similarly calculated. The standard deviation defining the present invention is a value obtained by measuring the particle distribution by a centrifugal precipitation method.

Not only is the average diameter of the complex microspheres of the present invention in the range of $0.05\sim30$ μm and the standard deviation of particle size within $1.0\sim2.5$ but also the ratio between the major and minor axes is between 1.0 and 1.2. This means that they are nearly spherical. More preferably, the complex microspheres according to the present invention have average diazaeter of $0.1\sim3$ μm, the standard deviation of their particle sizes is within $1.0\sim2.0$ and the ratio of their major to minor axes is between 1.0 and 1.1.

As described above, the complex microspheres of the present invention are characterized as being composed principally of polysiloxane and vinyl polymer which are integrally (unistructurally) mixed together and substantially free of covalent bonds therebetween, the weight ratio (polysiloxane/vinyl polymer) being $97/3\sim30/70$ therein. If the ratio of polysiloxane is greater than this range, the complex microspheres become easily breakable by a mechanical impact and less dispersive in macromolecule materials. If the ratio of vinyl polymer becomes greater than this range, on the other hand, the lower surface energy characteristics of the complex microspheres become adversely affected.

Examples of silanol group-forming silane shown above by Formula (1) includes $SiX_4$, $R^1SiX_3$, $R^1_2SiX_2$ and $R^1_3SiX$. According to the present invention, use may be made of a silanol group-forming compound containing at least 15 mole % or preferably 20 mole % or more of compounds shown by $R^1SiX_3$ and/or compounds shown by $SiX_4$. If they are contained by less than 15 mole %, it is not possible to obtain complex microspheres having the aforementioned required characteristics regarding particle size.

As explained above, $R^1$, $R^2$ and $R^3$ in Formulas (1) and (2) are non-substituted or substituted hydrocarbon groups having a carbon atom directly connected to a silicon atom and no radical polymerization. That $R^1$, $R^2$ and $R^3$ do not undergo radical polymerization is an indispensable condition that the principal elements of the complex microspheres of the present invention (polysiloxane and vinyl polymer) can be unistructurally mixed together substantially without forming any covalent bonds.

Examples of non-substituted hydrocarbon groups, which $R^1$, $R^2$ and $R^3$ may be, include alkyl group, cycloalkyl group, aryl group, alkylaryl group and aralkyl group. Alkyl groups with $1\sim4$ carbon atoms such as methyl group, ethyl group and butyl group or phenyl group may be preferably selected. Examples of substituted hydrocarbon groups, which $R^1$, $R^2$ and $R^3$ may be, include substituted hydrocarbon groups having halogen, epoxy group, cyano group and ureido group as substituent. In particular, it is advantageous to select γ-glycidoxypropyl group, β-(3,4-epoxy) cyclohexylethyl group, γ-chloropropyl group and trifluoropropyl group. These non-substituted and substituted hydrocarbon groups may be at any ratio.

Examples of aforementioned X in Formula (1) include alkoxy groups with $1\sim4$ carbon atoms such as methoxy group and ethoxy group, alkoxyethoxy groups having alkoxy group with $1\sim4$ carbon atoms such as methoxyethoxy group and butoxyethoxy group, acyloxy groups with $2\sim4$ carbon atoms such as acetoxy group and propoxy group, N,N-dialkylamino groups having alkyl group with $1\sim4$ carbon atoms such as dimethylamino group and diethylamino group, hydroxyl group, halogen atoms such as chlorine atom and bromine atom, and hydrogen atom.

Thus, practical examples of silanol group-forming compound of the form $SiX_4$ include tetramethoxy silane, tetraethoxy silane, tetrabutoxy silane and tetrachlorosilane. Practical examples of silanol group-forming compound of the form $R^1SiX_3$ include methyl trimethoxy silane, methyl triethoxy silane, methyl triacetoxy silane, phenyl trimethoxy silane, methyl tri(dimethylamino) silane, methyl trichloro silane, phenyl trichloro silane, methyl dichloromethoxy silane, methyl dichlorohydrogen silane, methyl trihydroxy silane, methyl dichloro hydroxy silane, and methyl chloro dihydroxy silane. Practical examples of silanol group-forming compound of the form $R^1_2SiX_2$ include dimethyl dimethoxy silane, dimethyl diethoxy silane, methylphenyl dimethoxy silane, dimethyl diacetoxy silane, dimethyl bis (dimethylamino) silane, dimethyl dichloro silane, diethyl dichloro silane, diphenyl dichloro silane, dimethyl chloromethoxy silane, methylethyl dichloro silane, dimethyl dihydroxy silane, and diethyl dihydroxy silane. Practical examples of silanol group-forming compound of the form $R^1_3SiX$ include trimethyl methoxy silane, trimethyl ethoxy silane, dimethylethyl methoxy silane, trimethyl acetoxy silane, trimethyl (dimethylamino) silane, trimethyl chloro silane, triphenyl chloro silane, and trimethyl hydroxy silane. These are examples where $R^1$ of Formula (1) is a non-substituted hydrocarbon group. Examples of silanol group-forming compound where $R^1$ is a substituted hydrocarbon group include silane compounds containing epoxy group such as γ-glycidoxypropyl trimethoxy silane, γ-glycidoxypropyl triethoxy silane and β-(3,4-epoxy cyclohexyl) ethyl trimethoxy silane, silane compounds containing haloalkyl group such as γ-chloropropyl trimethoxy silane and trifluoropropyl trimethoxy silane, silane compounds containing ureido group such as γureidopropyl trimethoxy silane, and silane compounds containing cyano group such as cyanopropyl trimethoxy silane. Examples of silanol group-forming compound shown by Formula (2) include octamethyl cyclotetra siloxane and tetramethyl tetraphenyl cyclotetra siloxane.

The aforementioned vinyl monomers of the particular kind referenced above by (II) are a starting material for the vinyl polymer which serve as the other principal element of the complex microspheres of the present invention and comprise one or more types of water-insoluble vinyl monomer which is not reactive with silanol group or silanol group-forming atoms. It is another indispensable condition for unistructurally mixing together the principal elements of the complex microspheres of the present invention (polysiloxane and vinyl polymer) substantially without forming any covalent bonds that use be made of such water-insoluble vinyl monomer that are not reactive with silanol group or silanol group-forming atoms.

Examples of such water insoluble vinyl monomer include esters of methacrylic acid such as methyl methacylate, ethyl methacylate, butyl methacrylate, isobutyl methacrylate, 2-ethylhexyl methacylate and cyclohexyl methacrylate, esters of acrylic acid such as methyl acrylate, ethyl acrylate and butyl acrylate, aromatic vinyl monomers such as styrene and α-methyl styrene, other monovalent monomers such as vinyl acetate, and divalent or higher monomers such as ethyleneglycol dimethacrylate, diethyleneglycol dimethacrylate, polyethyleneglycol diacrylate, polyethyleneglycol dimethacrylate, divinylbenzene, glycerine trimethacrylate, trimethylol propane methacrylate, bisphenol-A dimethacrylate, and diethoxylated bisphenol-A dimethacylate. These cited above are all water-insoluble vinyl monomers.

Complex microspheres of the present invention are produced by a reaction in the presence of silanol group-forming compound of aforementioned Type (I) and water-insoluble vinyl monomer of aforementioned Type (II) at weight ratio in the range of 99/1~33/67. If the ratio is not inside this range, complex microspheres of the desired kind cannot be obtained.

The method of producing complex microspheres of the present invention can be roughly divided into a first step wherein polysiloxane is produced and a second step wherein vinyl polymer is produced.

In the first step, polycondensation of aforementioned silanol group-forming compound serving as starting material of polysiloxane is carried out in an aqueous medium in the presence of water-insoluble vinyl monomer of an aforementioned kind serving as starting material for vinyl polymer while hydrolysis of the silanol group-forming compound takes place. Examples of aqueous medium to be used in this situation include water and uniform solvent systems containing water by 30 weight % or more, and preferably by 50 weight % or more. Examples of solvent which may be used with water in such a system include water-soluble solvents of methanol, ethanol, isopropanol, acetone, tetrahydrofuran and ethyl acetate.

Use may be made of any known catalyst for the hydrolysis and polycondensation of the silanol group-forming compound. Examples of such catalyst include organic bases such as ammonia, trimethylamine, triethylamine, triethylamine, and tetraethyl ammonium hydroxide, inorganic bases such as sodium hydroxide, potassium hydroxide, sodium carbonate, sodium hydrogen carbonate and sodium methoxide, titanium compounds such as titanium tetramethoxide and titanium tetrabutoxide, tin compounds such as dibutyl tin oxide and dibutyl tin laurate. Use of ammonia, trimethylamine and triethylamine is particularly preferable because their effects on the co-existing water-insoluble vinyl monomer are small and they can be easily separated from the reaction product.

The polycondensation reaction with hydrolysis is carried out by adding and stirring silanol group-forming compound and water-insoluble vinyl monomer in an aqueous medium system in which a catalyst is dissolved under the condition of two-layer system between aqueous solvent and water-insoluble contents. The present invention is not limited by any particular addition method. From the point of view of homogeneous reaction and operational convenience, it is preferable to preliminarily mix the silanol group-forming compound and water-insoluble vinyl monomer together and to add the mixture together into a reaction system. The temperature and time duration of the polycondensation with hydrolysis change, depending upon the kinds and concentrations of the starting materials, the type of the solvent, and the kind and the concentration of the catalyst. In general, however, temperature is in the range of 0°~90° C. and more preferably in the range of 0°~60° C. and the time duration is generally between 30 minutes and 24 hours. The first step is thus carried out to generate polysiloxane microspheres, to impregnate water-insoluble vinyl monomer thereinto and to thereby obtain microspheres mixed with water-insoluble vinyl monomer.

The second step is for the purpose of polymerization of water-insoluble vinyl monomer mixed with the polysiloxane microspheres in an aqueous solvent system in the presence of a radical initiator. There are several methods of going from the first step to the second step. If the catalyst which was used in the first step has no adverse effect on the reaction in the second step, one can go directly from the first step to the second step. If there is a problem, the catalyst is removed or inactivated first before the second step is started. The aqueous solvent system for the second step is similar to that for the first step. Water may preferably be used in the second step.

According to the present invention, no emulsifier is required for the polycondensation reaction with hydrolysis in an aqueous medium. When water-insoluble contents are emulsified in an aqueous reaction medium, mixtures of complex microspheres and single microspheres of vinyl polymer are easily formed at the second step. Complex microspheres thus produced cannot satisfy the desired properties described above.

Conventional radical initiators may be used for the polymerization of the water-insoluble vinyl monomer. Examples of such radical initiators include persulfates such as potassium persulfate and ammonium persulfate, hydroperoxides such as t-butyl hydroperoxide, diisopropylbenzene hydroperoxide and cumen hydroperoxide, organic peroxides such as di-t-butyl peroxide, t-butyl perbenzoate, dicumyl peroxide, t-butyl peracetate, t-butyl peroctanoate, t-butyl perphthalate, lauroyl peroxide, cyclohexanon peroxide and methyl isobutylketone peroxide, azo compounds such as 2,2'-azobis isobutylonitrile, 2,2'-azobis-2,4-dimethylvaleronitrile, 2-carbamoyl azoisobutylonitrile, dimethyl-2,2'-azobis isobutylate and 1,1'-azobis cyclohexane carbonitrile and redox catalysts such as persulfate-sodium thiosulfate-copper sulfate, hydroperoxide-ferric sulfate-sodium pyrophosphate-sodium phosphate and hydroperoxide-ferric sulfate-glucose-sodium pyrophosphate.

The reaction for polymerizing the water-insoluble monomer is carried out by adding and stirring in an atmosphere of an inactive gas a radical initiator in an aqueous medium in which polysiloxane microspheres mixed with water-insoluble vinyl monomer are dispersed. The temperature for the reaction varies, as in the case of the first step, depending upon various conditions. Normally, the temperature is between the room temperature and the boiling point of the water-insoluble vinyl monomer or preferably within a range of 50°~80° C. With the second step thus carried out to generate vinyl polymer, one can obtain complex microspheres of a desired kind composed principally of polysiloxane and vinyl polymer which are integrally (unistructurally) mixed together and substantially free of covalent bonds therebetween.

The complex microspheres produced by the aforementioned processes are composed of polysiloxane and vinyl polymer which are unistructurally mixed together and can satisfy desired properties such as relating to average diameter, standard deviation of the particle size and the ratio between the major and minor axes of obtained complex microspheres.

When complex microspheres of the present invention are added as modifiers for paints, cosmetic products, rubber and plastic products and paper, they may be added either directly or more generally in the form of a dispersion at 1~40 weight %, or more preferably at 5~30 weight % with respect to an organic medium or aqueous medium which is liquid or solid at room temperature. The solvent for this purpose may be appropriately selected according to the object to be modified. When the complex microspheres are used as a modifier for oil ink, oil paint or magnetic point, use as their solvent may be made of aliphatic esters such as ethyl acetate, aromatic hydrocarbons such as toluene and xylene, and ketones such as methylethylketone. When the complex microspheres are used as a modifier for radical polymelic resins or coating agents, use as their solvent may be made of vinyl monomers such as styrene, (meth) acrylates and vinyl acetate. When the complex microspheres are used as a modifier for lubricating oil or a lubricant for fiber processing, use as their solvent may be made of organic media such as mineral oils, fluid paraffin and a variety of synthetic esters, practical examples of which include butyl stearate, 2-ethylhexyl palmitate, trimethylol propane, trialiphatic esters, polyethers and polydimethyl siloxane. When the complex microspheres are used as a modifier for a mold release in the molding of a thermoplastic or thermosetting material, use as their solvent may be made of organic media which are solid at room temperature such as hydrocarbon wax, jelly and natural and synthetic ester wax. When the complex microspheres are used as a modifier for cosmetic materials, water-soluble paints or paper coating, use as their solvent may be made of water or an aqueous medium which is a mixture of water and a water-soluble organic medium such as ethanol and glycerine.

The complex microspheres of the present invention are particularly useful for the surface lubrication and preventing the blocking of thermoplastic films made from resin compounds having thermoplastic polymers as principal component. Examples of such thermoplastic films include linear aromatic polyester films, polyamide films, polyolefin films obtainable from homopolymers of ethylene or propylene or from copolymers having them as principal component, polystyrene films obtainable from homopolymers of styrene or copolymers having them as principal component, and vinyl polychloride films obtainable from homopolymers of vinyl chloride or from copolymer having them as principal component. Use of linear aromatic polyester films, polyamide films and polyolefin films are useful, depending on the purpose for which the use is made.

Aforementioned linear aromatic polyester films include all kinds as long as they are obtained from polyester which can be made into a film. Examples of such polyester include not only homopolyesters such as polyethylene terephthalate, polybutylene terephthalate, polyethylene-p-oxybenzoate, poly-1,4-cyclohexylene dimethylene terephthalate and polyethylene-2,6-naphthalene dicarboxylate, but also copolymerized polyesters. Examples of copolymerization element for synthesizing such copolymerized polyesters include diol elements such as diethylene glycol, neopentyl glycol and polyalkylene glycol, dicarboxylic acid elements such as adipic acid, sebacic acid, phthalic acid, isophthalic acid, 2,6-naphthalene dicarboxylic acid and 5-sodium sulfoisophthalic acid, and multi-function carboxylic acid elements such as trimellitic acid and pimelic acid. Aforementioned polyamide films may similarly be of any kind so long as they are obtained from polyamide which can be molded into the form of a film. Examples of such polyamide include nylone-6 and others having nylone-6 as principal component. Aforementioned polyolefin films are not limited by their density or stereoconfiguration of their molecules and may be of any kind if they are obtained from polyolefin which can be molded into a film.

Thermoplastic films according to the present invention are characterized as containing complex microspheres of the present invention by 0.005~5 weight %. If the particle size of the complex microspheres does not satisfy the aforementioned conditions limiting the present invention or if the contained amount of the complex microspheres is not within this range, either the lubricity and anti-blocking properties of the films cannot be improved as expected or the films themselves cannot serve the intended purpose well when used in a variety of situations. If a thermoplastic film which does not satisfy the aforementioned conditions of the present invention is used as a magnetic memory medium, for example, the thickness of the magnetic layer which will be formed thereover will be influenced and the medium's electric characteristics will be adversely affected. This is why it was stated above that the average diameter should preferably be 0.05~5 $\mu$m and that it is more preferable if the average diameter is 0.1~3 $\mu$m, the standard deviation of the particle size is 1.0~2.0 and the ratio of the major to minor axes is 1.0~1.1. As for the amount to be contained, it is preferred that the complex microspheres be contained by 0.05~3 weight % and more preferably by 0.1~1 weight %.

To produce a thermoplastic film containing complex microspheres, the polymers which are the main component of the thermoplastic film are caused to contain these complex microspheres prior to the formation of the film. The method of causing the polymers to contain the complex microspheres is not intended to limit the scope of the invention. The complex microspheres may be dispersed into the polymers in a molten state such that the desired concentration is reached. The complex microspheres may be added to the molten polymers such that their concentration becomes greater than the desired level and one is made of such polymers by diluting when a film is formed. According to still another method, the complex microspheres may be added while the viscosity of the molten polymers is still low and the spheres can be easily dispersed before the polymerization starts. For the production of linear aromatic polyester films and polyamide films, it is effective to add and disperse the complex microspheres at the time of polymerization of these polymers. For the production of linear aromatic polyester films, in particular, it is preferable to preliminarily disperse the complex microspheres in alkylene glycol such as ethylene glycol or 1,4-butandiol and then to add and disperse them in a polymerization system. In this situation, it is even more preferable to crush the associated particles of the complex microspheres inside the alkylene glycol to reduce them into fine particles and then to add these fine particles to the polymerizing system.

As mentioned above, the thermoplastic films of the present invention are characterized as containing complex microspheres of a specified kind by a specified amount. As long as the intended effects of the present invention are not adversely affected, however, it is permissible to add ultraviolet absorbefacients, antioxidants, antistatic agents and other additives.

Thermoplastic films of the present invention may be produced by any of the known methods from a resin composition with polymers as its principal component and complex microspheres of a specified kind. Examples of the production method which may be used for this purpose include the inflation method, the casting method, the one-roller stretch method and the two-roller stretch method. Thermoplastic films of the present invention may be laminated with a film of another type, have a surface coated with a coating material or undergo a high-level physical, chemical or electrical processing, depending on the purpose for which they are intended to be used.

In what follows, the present invention will be explained by way of actual examples but it goes without saying that these examples are intended to be illustrative and not to limit the scope of the present invention.

TEST SERIES 1

In this series of tests, complex microspheres were produced by different methods and the results of tests thereon are summarized in Table 1. The results shown in Table 1 were measured as followed:

(1) Average diameter and ratio between major and minor axes

Complex microspheres of each kind were photographed by a scanning electron microscope (SEM) and 50 particles were arbitrarily selected from the photographic image. Regarding each of these selected particles, its major axis $D_L$ and minor axis $D_S$ (as defined above) were measured. The average of $(D_L+D_S)/2$ over these particles was listed as the average diameter. The average of $D_L/D_S$ was listed as the ratio (between the major and minor axes).

(2) Standard deviation of particle size

Complex microspheres of each kind were ultrasonically dispersed in water containing 1 weight % of 10 mole adduct of nonylphenol ethylene oxide and measurements were taken by using such dispersions by means of an automatic ultracentrifuge particle distributor (Model CAP-700 produced by Horiba Seisakusho).

(3) Polysiloxane content (weight %)

Complex microspheres of each obtained kind were heated in a mixture of nitric acid and perchloric acid (with mixing ratio of 5/2) and after they were hardened and dried to dissociate organic components, the $SiO_2$ content was obtained by the molybdenum blue method (Colorimetric Analysis: Anal. Chem., Vol. 19, 873 (1947)). Polysiloxane content was calculated from the $SiO_2$ content thus obtained and the composition of the silane which has been used.

TEST EXAMPLE 1

A flask was filled with 658 ml of water and 8.3 g of 28% ammonium water and a mixture of 6 g (0.029 mole) of ethylorthosilicate, 23 g (0.078 mole) of octamethyl cyclotetra siloxane, 71 g (0.52 mole) of trimethoxymethyl silane and 10 g (0.096 mole) of styrene was dropped thereinto over a period of one hour while it was slowly stirred at room temperature such that a two-layer condition of the contents was maintained for polycondensation while hydrolysis took place at the boundary surface between the two layers of solutions. With the reaction progressing, the reaction products precipitated gradually into the lower layer and the lower layer became white and turbid. In two hours, the two-layer condition disappeared and a uniform single-layer condition resulted. After it was stirred rather strongly for three more hours under the same conditions, white particles were filtered out and placed inside another flask together with 1000 ml of water. The contents were heated to 70° C. in a nitrogen flow and 100 ml of 1% aqueous solution of potassium persulfate was dropped over a period of one hour. After an aging process of 3 hours under the same conditions for radical polymerization, the contents were cooled to room temperature and white complex particles were filtered. These white complex particles were washed and dried to obtain 60 g of complex microspheres.

The average diameter of these complex microspheres thus obtained was 1.1 µm, the ratio of their major to minor axes was 1.02, the standard deviation of their particle size was 1.42 and the polysiloxane content was 86.3 weight %.

TEST EXAMPLE 2

As in Test Example 1, use was made of 658 ml of water, 8.3 g of 28% ammonium water, 6 g (0.029 mole) of ethylorthosilicate, 23 g (0.078 mole) of octamethyl cyclotetra siloxane, 71 g (0.52 mole) of trimethoxymethyl silane, 38 g (0.36 mole) of styrene and 2 g (0.015 mole) of divinyl benzene for hydrolysis, polycondensation and radical polymerization to obtain 93 g of complex microspheres.

The average diameter of these complex microspheres thus obtained was 1.0 µm, the ratio of their major to minor axes was 1.03, the standard deviation of their particle size was 1.50 and the polysiloxane content was 64.7 weight %.

TEST EXAMPLE 3

As in Test Example 1, use was made of 658 ml of water, 8.3 g of 28% ammonium water, 75 g (0.36 mole) of ethylorthosilicate, 75 g (0.55 mole) of trimethoxy methyl silane, and 5 g (0.048 mole) of styrene for hydrolysis, polycondensation and radical polymerization to obtain 55 g of complex microspheres.

The average diameter of these complex microspheres thus obtained was 1.2 μm, the ratio of their major to minor axes was 1.04, the standard deviation of their particle size was 1.67 and the polysiloxane content was 92.9 weight %.

TEST EXAMPLE 4

As in Test Example 1, use was made of 658 ml of water, 16.6 g of 28% ammonium water, 6 g (0.029 mole) of ethylorthosilicate, 23 g (0.078 mole) of octamethyl cyclotetra siloxane, 71 g (0.52 mole) of trimethoxy methyl silane, and 10 g (0.1 mole) of methyl methacrylate for hydrolysis, polycondensation and radical polymerization to obtain 59 g of complex microspheres.

The average diameter of these complex microspheres thus obtained was 0.5 μm, the ratio of their major to minor axes was 1.01, the standard deviation of their particle size was 1.31 and the polysiloxane content was 87.1 weight %.

TEST EXAMPLE 5

As in Test Example 1, use was made of 329 ml of water, 329 g of methanol, 16.6 g of 28% ammonium water, 6 g (0.029 mole) of ethylorthosilicate, 23 g (0.078 mole) of octamethyl cyclotetra siloxane, 71 g (0.52 mole) of trimethoxy methyl silane, and 10 g (0.096 mole) of styrene for hydrolysis, polycondensation and radical polymerization to obtain 60 g of complex microspheres.

The average diameter of these complex microspheres thus obtained was 0.4 μm, the ratio of their major to minor axes was 1.05, the standard deviation of their particle size was 1.45 and the polysiloxane content was 87.9 weight %.

TEST EXAMPLE 6

As in Test Example 1, use was made of 658 ml of water, 8.3 g of 28% ammonium water, 6 g (0.029 mole) of ethylorthosilicate, 23 g (0.078 mole) of octamethyl cyclotetra siloxane, 71 g (0. 52 mole) of trimethoxy methyl silane, and 64 g (0.61 mole) of styrene for hydrolysis and polycondensation. Thereafter, the white particles were not filtered but 9 g of 89% phosphoric acid was added to neutralize the reacting system. Next, 330 ml of water was added for radical polymerization as in Test Example 1 to obtain 110 g of complex microspheres.

The average diameter of these complex microspheres thus obtained was 0.8 μm, the ratio of their major to minor axes was 1.04, the standard deviation of their particle size was 1.77 and the polysiloxane content was 51.0 weight %.

TEST EXAMPLE 7

As in Test Example 1, use was made of 658 ml of water, 8.3 g of 28% ammonium water, 26 g (0.12 mole) of ethylorthosilicate, 19 g (0.064 mole) of octamethyl cyclotetra siloxane, 17 g (0. 12 mole) of trimethoxy methyl silane, and 62 g (0.60 mole) of styrene for hydrolysis, polycondensation and radical polymerization to obtain 75 g of complex microspheres.

The average diameter of these complex microspheres thus obtained was 0.7 μm, the ratio of their major to minor axes was 1.06, the standard deviation of their particle size was 1.71 and the polysiloxane content was 39.3 weight %.

TEST EXAMPLE 8

As in Test Example 1, use was made of 658 ml of water, 8.3 g of 28% ammonium water, 40 g (0.19 mole) of ethylorthosilicate, 53 g (0.18 mole) of octamethyl cyclotetra siloxane, 12 g (0.088 mole) of trimethoxy methyl silane, and 15 g (0.14 mole) of styrene for hydrolysis, polycondensation and radical polymerization to obtain 65 g of complex microspheres.

The average diameter of these complex microspheres thus obtained was 1.1 μm, the ratio of their major to minor axes was 1.04, the standard deviation of their particle size was 1.56 and the polysiloxane content was 81.5 weight %.

TEST EXAMPLE 9

As in Test Example 1, use was made of 658 ml of water, 8.3 g of 28% ammonium water, 6 g (0.029 mole) of ethylorthosilicate, 23 g (0.078 mole) of octamethyl cyclotetra siloxane, 71 g (0.52 mole) of trimethoxy methyl silane, 12 g (0.12 mole) of styrene and 1 g (0.0025 mole) of polyethyl glycol (molecular weight 400) monomethacrylate for hydrolysis, polycondensation and radical polymerization to obtain 60 g of complex microspheres.

The average diameter of these complex microspheres thus obtained was 1.0 μm, the ratio of their major to minor axes was 1.03, the standard deviation of their particle size was 1.45 and the polysiloxane content was 85.8 weight %.

COMPARISON EXAMPLE 1

After 658 ml of water and 8.3 g of 28% ammonium water were placed inside a flask, a mixture of 6 g (0.029 mole) of ethylorthosilicate, 23 g (0.078 mole) of octamethyl cyclotetra siloxane and 71 g (0.52 mole) of trimethoxymethyl silane was dropped thereinto over a period of one hour while it was slowly stirred at room temperature such that a two-layer condition of the contents was maintained for polycondensation while hydrolysis took place at the boundary surface between the two layers of solutions. After it was stirred rather strongly for three more hours under the same conditions, the contents were neutralized and a white suspension of particles was obtained by wet pulverization.

The average diameter of the white particle suspension thus obtained was 1.3 μm, the ratio of their major to minor axes was 1.02, the standard deviation of their particle size was 1.1 μm. Next, this white particle suspension was heated to 70° C. in a nitrogen flow and after 1 g of potassium persulfate was dissolved therein, 10 g (0.096 mole) of styrene was dropped over a period of 1 hour. After an aging process of 3 hours under the same conditions for radical polymerization, the contents were cooled to room temperature and white cake-like powder was filtered out. This white cake-like powder was washed and dried to obtain 60 g of white powder. The shape of the white powder thus obtained was not spherical but indefinite.

COMPARISON EXAMPLE 2

As in Test Example 1, use was made of 658 ml of water, 8.3 g of 28% ammonium water, 6 g (0.029 mole) of ethylorthosilicate, 92 g (0.31 mole) of octamethyl cyclotetra siloxane, 2 g (0.015 mole) of trimethoxy methyl silane, and 10 g (0.096 mole) of styrene for hydrolysis and polycondensation. There were no microspheres in the reaction system in the state of a white turbid suspension and a separation of liquid monomers were observed in part. After 89% phosphoric acid was added to this reaction system to neutralize the reaction system, 330 ml of water and 1 g of potassium persulfate were added for radical polymerization as in Test Example 1. The particles generated in the reaction system were not spherical but indefinite in shape.

COMPARISON EXAMPLE 3

As in Test Example 1, use was made of 658 ml of water, 8.3 g of 28% ammonium water, 6 g (0.029 mole) of ethylorthosilicate, 23 g (0.078 mole) of octamethyl cyclotetra siloxane and 71 g (0.52 mole) of trimethoxymethyl silane for hydrolysis and polycondensation to obtain microspheres.

The average diameter of these microspheres thus obtained was 1.2 μm, the ratio of their major to minor axes was 1.03, and the standard deviation was 2.1.

COMPARISON EXAMPLE 4

As in Test Example 1, use was made of 658 ml of water, 8.3 g of 28% ammonium water, 75 g (0.36 mole) of ethylorthosilicate and 75 g (0.55 mole) of trimethoxymethyl silane for hydrolysis and polycondensation to obtain microspheres.

The average diameter of these microspheres thus obtained was 1.1 μm, the ratio of their major to minor axes was 1.03, and the standard deviation was 2.0.

COMPARISON EXAMPLE 5

As in Test Example 1, use was made of 658 ml of water, 8.3 g of 28% ammonium water, 2 g (0.0097 mole) of ethylorthosilicate, 7.7 g (0.026 mole) of octamethyl cyclotetra siloxane, 23.7 g (0.17 mole) of trimethoxy methyl silane, and 80 g (0.77 mole) of styrene for hydrolysis and polycondensation. A separation of styrene was observed in part in the reaction system. After 89% phosphoric acid was added to this reaction system to neutralize the reaction system, 330 ml of water and 1 g of potassium persulfate were added for radical polymerization as in Test Example 1. A completely uniform mixture of microspheres and styrene homopolymers was generated in the reaction system.

TABLE 1

| Examples | (I)/(II) Weight Ratio | $n \leq 1$ Mole % | Average Diameter (μm) | Ratio | Standard Deviation |
|---|---|---|---|---|---|
| Test 1 | 86.3/13.7 | 63.8 | 1.1 | 1.02 | 1.42 |
| Test 2 | 64.7/35.7 | 63.8 | 1.0 | 1.03 | 1.50 |
| Test 3 | 92.9/7.1 | 100 | 1.2 | 1.04 | 1.67 |
| Test 4 | 87.1/12.9 | 63.8 | 0.5 | 1.01 | 1.31 |
| Test 5 | 87.9/12.1 | 63.8 | 0.4 | 1.05 | 1.45 |
| Test 6 | 51.0/49.0 | 63.8 | 0.8 | 1.04 | 1.77 |
| Test 7 | 39.3/60.7 | 50.0 | 0.7 | 1.06 | 1.71 |
| Test 8 | 81.5/18.5 | 28.0 | 1.1 | 1.04 | 1.56 |
| Test 9 | 85.8/14.2 | 63.8 | 1.0 | 1.03 | 1.45 |
| Comp. 1 | — | — | — | — | — |
| Comp. 2 | — | 3.4 | — | — | — |
| Comp. 3 | 100/0 | 63.8 | 1.2 | 1.03 | 2.1 |
| Comp. 4 | 100/0 | 100 | 1.1 | 1.03 | 2.0 |
| Comp. 5 | 20/80 | 63.8 | — | — | — |

Notes:
Test: Test examples
Comp.: Comparison Examples
(I): Polysiloxane
(II): Vinyl polymers
$n \leq 1$: Ratio of compounds with n of Formulas for (I) $\leq 1$ among constituents of (I)
Ratio: $D_L/D_S$

TEST SERIES 2

Dispersing elements of complex microspheres were prepared as shown in Table 2 and tested. The test results shown in Table 2 were measured as followed:

(1) Ability to maintain original shape

For each dispersing element obtained for this series of tests, 50 particles were arbitrarily selected from the aforementioned photographic image taken by the scanning electron microscope. Regarding each of these selected particles, the presence or absence of damage was determined by observation and evaluated as follows:

A: One particle or less with observable damage
B: 2~6 particles with observable damage
C: 7~24 particles with observable damage
D: 25 or more particles with observable damage (2) Presence or absence of associated particles Each of the dispersing elements was observed by an optical microscope of magnification 1000 and the degree of association of particles within an area of 20×20 μm was evaluated as follows:

A: Associated particles are less than 1% of total
B: Associated particles are 14 or greater and less than 10% of the total particles
C: Associated particles are 10% or greater (3) Dispersion stability Each obtained dispersing element was placed inside a conic glass container, sealed and left quietly at room temperature. The state of particle separation was observed over an extended period of time and the results were evaluated as follows:

A: No particle separation observed even after one month
B: Particle separation observed in 7 days~one month
C: Particle separation observed in 2~6 days
D: Particle separation observed after one day Ethylene glycol was measured such that a specified concentration of 40 g of particles shown in Table 2 would be obtained and after they were preliminarily dispersed by means of a homo-mixer, they were processed for 5 hours with a batch-type sand granulator (of vessel capacity 400 cc produced by Igarashi Kikai-sha) using glass beads of 0.60~0.85 mmφ to prepare Dispersing Elements 1~8, 10 and A~D. Dispersing Element 9 was prepared by processing 40 g of particles shown in Table 2 and 160 g of ethylene glycol for 30 minutes with the homo-mixer.

TABLE 2

| Dispersing Elements | Particles | Weight % | Evaluations (1) | (2) | (3) |
|---|---|---|---|---|---|
| 1 | Test 1 | 20 | A | B | A |
| 2 | Test 2 | 20 | A | B | A |
| 3 | Test 3 | 20 | B | B | B |
| 4 | Test 4 | 15 | A | B | A |

TABLE 2-continued

| Dispersing Elements | Particles | Weight % | Evaluations (1) | (2) | (3) |
|---|---|---|---|---|---|
| 5 | Test 6 | 20 | A | B | A |
| 6 | Test 7 | 20 | A | B | B |
| 7 | Test 8 | 20 | A | B | A |
| 8 | *1 | 20 | A | B | B |
| 9 | Test 1 | 20 | A | C | B |
| 10 | *2 | 20 | A | B | A |
| A | Comp 3 | 20 | C | C | C |
| B | Comp 5 | 20 | D | D | D |
| C | *3 | 20 | D | B | D |
| D | *4 | 20 | D | B | C |

Notes:
Test: Test examples
Comp: Comparison Examples
(1): Ability to maintain original shape
(2): Presence or absence of associated particles
(3): Dispersion stability
*1: Test Example 1 before drying (moisture = 65%)
*2: Mixture of Test Example 2/Test Example 5: = 1/2 (weight ratio)
*3: Spherical polymethylsilsesquioxane with average diameter of 1.0 μm described in Japanese Patent Publication Tokkai 63-77940
*4: Spherical silica with average diameter of 0.8 μm described in Japanese Patent Publication Tokkai 63-185439

TEST SERIES 3

Thermoplastic films containing complex microspheres or their dispersing elements were produced and tested as shown in Tables 3 and 4. The test results in Tables 3 and 4 were obtained as follows:

(1) Presence or absence of associated particles

Each of the produced films was photographed by means of the aforementioned electron microscope. An area of 70×50 μm from the image was observed and particles therein were evaluated as follows:

A: No associated particles at all
B: Small presence of associated particles
C: Associated particles are 10% or greater (2) Presence or absence of voids The photographic image from (1) was observed to detect the presence and absence of voids around the particles.

(3) Lubricity

Tape-like samples of width 13 mm were prepared from the produced films. Each sample was made to contact with a fixed pin (with 7 mmφ) of a stainless steel rod with an input load of 30 g and was caused to undergo a reciprocating motion 30 times at 2.5 re/min. The coefficient of friction was measured at the time of the 30th reciprocating motion and the surface condition of the sample was visually inspected. The test results were evaluated as follows:

A: No white traces or damages observed
B: Slight white traces or damages
C: Clear presence of white traces or damages
D: Significant presence of white traces or damages Test Examples 10~17 and comparison Examples 6~9

Use was made of 100 weight parts of dimethyl terephthalate, 70 weight parts of ethylene glycol and 0.035 weight parts of hydrated manganese acetate for an ester exchange reaction at 23° C. according to a known method. After 0.03 weight parts of trimethyl phosphate were added thereinto, the dispersing elements shown in Table 3 were added with stirring such that the contents of the complex microspheres would come to a specified level. After 0.03 weight parts of antimony trioxide was added, the mixture was heated for a polycondensation process under a high-temperature, high vacuum condition according to a known method to obtain polyethylene terephthalate with limiting viscosity of 0.61 dl/g.

Polyethylene terephthalate thus obtained was dried at 180° C. and after it was made into a sheet by means of an extruder set for 290° C., it was stretched at 90° C. by 3.5 longitudinally and by 4.0 transversely. A film with thickness of 15 μm was produced by thermosetting.

Comparison Example 4 indicates a blank.

TEST EXAMPLES 18~20 AND COMPARISON EXAMPLES 10~12

Microparticles shown in Table 4 were placed inside a polymerization reactor together with 200 weight parts of ε-caprolactam, 6 weight parts of water, 0.029 weight parts of acetic acid and polymer such that their content would be as preliminarily specified. With nitrogen gas substituted into, the reactor was sealed and maintained at 260° C. From the moment when the internal pressure reached 3.5 kg/cm$^2$, a part of water inside the reactor was removed and the reaction was continued for 3 hours with the internal pressure maintained at 3.5 kg/cm$^2$. Next, the internal pressure was gradually reduced to the normal level over a period of one hour, and polymerization was further continued in a nitrogen flow for 3 hours to obtain polyamide. The relative viscosity of the polyamide thus obtained was 2.60. The polyamide was extracted from the T die at 250° C. by means of an extruder with diameter of 30 mm and solidified by means of a casting roll at 110° C. to produce a film of thickness 40 μm.

Comparison Example 12 indicates a blank.

TEST EXAMPLES 21~23

Complex microspheres of Test Example 1, 3 or 6, polyethylene resin (Yukaron LF-540B produced by Mitsubishi Yuka Co.) and an antistatic agent (1/1 mixture of glycerine monostearate and N,N-bishydroxyethyl laurylamine) were mixed together by means of a two-roller extruder (25 mmo) to prepare three kinds of master-chip containing 3 weight % of complex microspheres according to Test Example 1, 3 or 6 and 2 weight % of antistatic agent.

Next, use was made of polyethylene resin (of the same kind as above) containing 10 weight % of each master-chip to produce three kinds of polyethylene films by means of an inflation-type film-making apparatus of 30 mmφ. The external appearance of each film was good and no blocking was observed in the wound-up film rolls even after they were left for 2 weeks under the conditions of 23° C. and 65% RH.

For comparison, films were produced in the identical manner as above except no complex microspheres were used. These comparison films did not contain any foreign material and their external appearance was good but significant blocking was observed after they were left under the same condition as described above.

In summary, the present invention provides stable complex microspheres with small average diameter, small size distribution, uniform shape and no associated particles. By adding such complex microspheres, it is possible to provide thermoplastic films with improved lubricity and anti-blocking properties without adversely affecting their other desirable characteristics.

TABLE 3

| Examples | Dispersing Element | Active Content | (1) | (2) | Lubricity (3A) | (3B) |
|---|---|---|---|---|---|---|
| Test 10 | 1 | 0.3 | A | No | 0.18 | B |

TABLE 3-continued

| Examples | Dispersing Element | Active Content | (1) | (2) | Lubricity (3A) | (3B) |
|---|---|---|---|---|---|---|
| Test 11 | 2 | 0.3 | A | No | 0.17 | B |
| Test 12 | 3 | 0.3 | A | No | 0.17 | B |
| Test 13 | 9 | 0.3 | B | No | 0.19 | B |
| Test 14 | 4 | 0.5 | A | No | 0.19 | B |
| Test 15 | 5 | 0.2 | A | No | 0.17 | B |
| Test 16 | 7 | 0.3 | A | No | 0.18 | B |
| Test 17 | 10 | 0.3 | A | No | 0.18 | B |
| Comp 6 | A | 0.3 | B | Yes | 0.22 | D |
| Comp 7 | B | 0.3 | C | Yes | 0.24 | D |
| Comp 8 | C | 0.3 | A | Yes | 0.20 | D |
| Comp 9 | — | 0 | — | No | 0.42 | D |

Notes:
Test: Test examples
Comp: Comparison Examples
(1): Associated particles in weight % with respect to polyester
(2): Voids; Yes means clearly observable
(3A): Coefficient of friction
(3B): Abrasion resistance

TABLE 4

| Examples | Particles | Active Content | (1) | (2) | Abrasion Resistance |
|---|---|---|---|---|---|
| Test 18 | Test 1 | 0.2 | A | No | B |
| Test 19 | Test 1 | 0.1 | A | No | B |
| Test 20 | Test 3 | 0.2 | A | No | B |
| Comp 10 | *3 | 0.2 | A | Yes | C |
| Comp 11 | *5 | 0.2 | C | Yes | D |
| Comp 12 | — | 0 | — | No | D |

Notes:
See Notes above.
*5: Non-spherical silica particles of average diameter 2 μm (Thyroid 244 produced by Fuji Davidson Co.)

What is claimed is:

1. Complex microspheres consisting of polysiloxane and vinyl polymer, said polysiloxane and vinyl polymer being unistructurally mixed together and being substantially free of covalent bonds therebetween, said polysiloxane and vinyl polymer being contained at ratio of 97/3~30/70 by weight, the average diameter of said complex microspheres being 0.05~30 μm, the standard deviation of particle size of said complex microspheres being 1.0~2.5, and the ratio between the major and minor axes of said complex microspheres being 1.0~1.2, said complex microspheres being produced by the steps of causing polycondensation of silanol group-forming compound while said silanol group-forming compound undergoes hydrolysis in the absence of emulsifier inside an aqueous solvent containing said silanol-group forming compound and water-insoluble vinyl monomer at weight ratio of 99/1~33/67 under the condition of two layer system of said aqueous solvent and water-insoluble contents consisting of said silanol group-forming compound and water-insoluble vinyl monomer, thereby generating polysiloxane microspheres, impregnating said water-insoluble vinyl monomer into said polysiloxane microspheres to form polysiloxane microspheres mixed with said water-insoluble vinyl monomer, and polymerizing said water-insoluble vinyl monomer mixed in said polysiloxane microspheres in the presence of a radical initiator, thereby obtaining said complex microspheres, said silanol group-forming compound being of the form of Formula (1) or (2) and containing at least 15 mole % (converted to silicon quantity) of compounds of form $R^1$-$SiX_3$ and/or compounds of form $SiX_4$, and said water-insoluble vinyl monomer comprising one or more kinds which are not reactive with silanol group and silanol group-forming atoms, where said Formula (1) is $R^1_p$-$SiX_{4-p}$, and said Formula (2) is

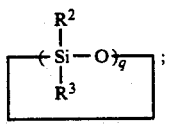

p is an integer 0~3; q ia an integer 3~20; $R^1$, $R^2$ and $R^3$ are non-substituted or substituted hydrocarbon groups having a carbon atom directly connected to a silicon atom and no tendency to undergo radical polymerization; and X is alkoxy group with 1~4 carbon atoms, alkoxyethoxy group having alkoxy group with 1~4 carbon atoms, acyloxy group with 2~4 carbon atoms, N,N-dialkylamino group having alkyl group with 1~4 carbon atoms, hydroxyl group, halogen atom, or hydrogen atom.

2. The complex microspheres of claim 1 wherein said $R^1$, $R^2$ and $R^3$ are each alkyl group with 1~4 carbon atoms or phenyl group.

3. The complex microspheres of claim 1 wherein said water-insoluble vinyl monomer is one or more kinds selected from the group consisting of alkyl acrylate, alkyl methacrylate and aromatic vinyl monomers.

4. The complex microspheres of claim 2 wherein said water-insoluble vinyl monomer is one or more kinds selected from the group consisting of alkyl acrylate, alkyl methacrylate and aromatic vinyl monomers.

5. The complex microspheres of claim 1 wherein the average diameter of said complex microspheres is 0.05~5 μm.

6. The complex microspheres of claim 2 wherein the average diameter of said complex microspheres is 0.05~5 μm.

7. The complex microspheres of claim 3 wherein the average diameter of said complex microspheres is 0.05~5 μm.

8. The complex microspheres of claim 4 wherein the average diameter of said complex microspheres is 0.05~5 μm.

9. A thermoplastic film containing complex microspheres, of which the average diameter if 0.1~3 μm, the standard deviation of particle size is 1.0~2.0 and the ratio of major and minor axes is 1.0~1.1, said complex microspheres being contained by 0.005~5 weight % in said thermoplastic film, said complex microspheres consisting of polysiloxane and vinyl polymer, said polysiloxane and vinyl polymer being unistructurally mixed together and being substantially free of covalent bonds therebetween, said polysiloxane and vinyl polymer being contained at ratio of 97/3~30/70 by weight, the average diameter of said complex microspheres being 0.05~30 μm, the standard deviation of particle size of said complex microspheres being 1.0~2.5, and the ratio between the major and minor axes of said complex microspheres being 1.0~1.2, said complex microspheres being produced by the steps of causing polycondensation of silanol group-forming compound while said silanol group-forming compound undergoes hydrolysis in the absence of emulsifier inside an aqueous solvent containing said silanol-group forming compound and water-insoluble vinyl monomer at weight ratio of 99/1~33/67 under the condition of two layer system of said aqueous solvent and water-insoluble contents consisting of said silanol group-forming compound and water-insoluble vinyl monomer, thereby generating polysiloxane microspheres, impregnating said water-insoluble vinyl monomer into said polysiloxane microspheres to form polysiloxane microspheres mixed with said water-insoluble vinyl monomer, and polymerizing said water-insoluble vinyl monomer mixed in said polysiloxane microspheres in the presence of a radical initiator, thereby obtaining said complex microspheres, said silanol group-forming compound being of the form of Formula (1) or (2) and containing at least 15 mole % (converted to silicon quantity) of compounds of form $R^1\text{-}SiX_3$ and/or compounds of form $SiX_4$, and said water-insoluble vinyl monomer comprising one or more kinds which are not reactive with silanol group and silanol group-forming atoms, where said Formula (1) is $R^1_p\text{-}SiX_{4-p}$, and said Formula (2) is

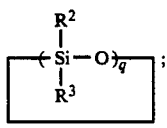

p is an integer $0\sim3$; q is an integer $3\sim20$; $R^1$, $R^2$ and $R^3$ are non-substituted or substituted hydrocarbon groups having a carbon atom directly connected to a silicon atom and no tendency to undergo radical polymerization; and X is alkoxy group with $1\sim4$ carbon atoms, alkoxyethoxy group having alkoxy group with $1\sim4$ carbon atoms, acyloxy group with $2\sim4$ carbon atoms, N,N-dialkylamino group having alkyl group with $1\sim4$ carbon atoms, hydroxyl group, halogen atom, or hydrogen atom.

10. The thermoplastic film of claim 9 wherein said water-insoluble vinyl monomer is one or more kinds selected from the group consisting of alkyl acrylate, alkyl methacrylate and aromatic vinyl monomers.

11. The thermoplastic film of claim 9 wherein the average diameter of said complex microsphere is $0.05\sim5$ μm.

12. The thermoplastic film of claim 9 which is formed of a resin composition having linear aromatic polyester as its principal component.

13. The thermoplastic film of claim 10 which is formed of a resin composition having linear aromatic polyester as its principal component.

14. The thermoplastic film of claim 11 which is formed of a resin composition having linear aromatic polyester as its principal component.

15. A method of making complex microspheres consisting of polysiloxane and vinyl polymer, said method comprising the steps of causing polycondensation of silanol group-forming compound while said silanol group-forming compound undergoes hydrolysis in the absence of emulsifier inside an aqueous solvent containing said silanol-group forming compound and water-insoluble vinyl monomer at weight ratio of $99/1\sim33/67$ under the condition of two layer system of said aqueous solvent and water-insoluble contents consisting of said silanol group-forming compound and water-insoluble vinyl monomer, thereby generating polysiloxane microspheres, impregnating said water-insoluble vinyl monomer into said polysiloxane microspheres to form polysiloxane microspheres mixed with said water-insoluble vinyl monomer, and polymerizing said water-insoluble vinyl monomer mixed in said polysiloxane microspheres in the presence of a radical initiator, thereby obtaining said complex microspheres, said silanol group-forming compound being of the form of Formula (1) or (2) and containing at least 15 mole % (converted to silicon quantity) of compounds of form $R^1\text{-}SiX_3$ and/or compounds of form $SiX_4$, and said water-insoluble vinyl monomer comprising one or more kinds which are not reactive with silanol group and silanol group-forming atoms, where said Formula (1) is $R^1_p\text{-}SiX_{4-p}$; said Formula (2) is

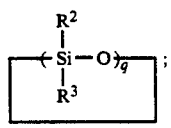

p is an integer $0\sim3$; q is an integer $3\sim20$; $R^1$, $R^2$ and $R^3$ are non-substituted or substituted hydrocarbon groups having a carbon atom directly connected to a silicon atom and no tendency to undergo radical polymerization; and X is alkoxy group with $1\sim4$ carbon atoms, alkoxyethoxy group having alkoxy group with $1\sim4$ carbon atoms, acyloxy group with $2\sim4$ carbon atoms, N,N-dialkylamino group having alkyl group with $1\sim4$ carbon atoms, hydroxyl group, halogen atoms, or hydrogen atom.

16. The method of claim 15 wherein said $R^1$, $R^2$ and $R^3$ are each alkyl group with $1\sim4$ carbon atoms or phenyl group.

17. The method of claim 15 wherein said water-insoluble vinyl monomer is one or more kinds selected from the group consisting of alkyl acrylate, alkyl methacrylate and aromatic vinyl monomers.

18. The method of claim 16 wherein said water-insoluble vinyl monomer is one or more kinds selected from the group consisting of alkyl acrylate, alkyl methacrylate and aromatic vinyl monomers.

* * * * *